(12) United States Patent
Helm

(10) Patent No.: US 9,095,911 B2
(45) Date of Patent: Aug. 4, 2015

(54) POWER OPERATED CHUCK

(75) Inventor: Peter Helm, Meckenbeuren (DE)

(73) Assignee: SMW—AUTOBLOK Spann—systeme GmbH, Meckenbeuren (DE)

( * ) Notice: Subject to any disclaimer, the term of this patent is extended or adjusted under 35 U.S.C. 154(b) by 899 days.

(21) Appl. No.: 13/066,632

(22) Filed: Apr. 20, 2011

(65) Prior Publication Data

US 2011/0260416 A1  Oct. 27, 2011

(30) Foreign Application Priority Data

Apr. 27, 2010 (EP) ..................................... 10161101

(51) Int. Cl.
*B23B 31/16* (2006.01)
*B23Q 3/18* (2006.01)

(52) U.S. Cl.
CPC .......... *B23B 31/16045* (2013.01); *B23Q 3/183* (2013.01); *B23B 2270/12* (2013.01); *Y10T 279/10* (2015.01); *Y10T 279/19* (2015.01); *Y10T 279/1973* (2015.01); *Y10T 279/26* (2015.01)

(58) Field of Classification Search
CPC ...................... B23B 31/16045; B23B 2270/12; B23Q 3/183
USPC ............................ 279/2.1, 110, 121, 133, 127
See application file for complete search history.

(56) References Cited

U.S. PATENT DOCUMENTS

| 966,630 | A | * | 8/1910 | Whiton ........................ 279/110 |
| 2,323,091 | A | * | 6/1943 | Sneddon, Jr. et al. ........ 279/4.11 |
| 3,142,491 | A |   | 7/1964 | Ohashi |
| 3,491,996 | A |   | 1/1970 | Ohmberger |
| 4,527,808 | A | * | 7/1985 | Hiestand ........................ 279/132 |
| 6,116,617 | A | * | 9/2000 | Kofler ............................ 279/133 |

FOREIGN PATENT DOCUMENTS

| CN | 2123391 | 12/1992 |
| CN | 101491841 | 7/2009 |
| CN | 101543897 | 9/2009 |
| EP | 0069917 | 1/1983 |
| EP | 0085782 | 8/1983 |
| EP | 2105226 | 9/2009 |
| GB | 824016 | * 11/1959 |
| GB | 848551 | * 9/1960 |
| GB | 2176135 | 12/1986 |
| JP | 6114604 | 4/1994 |
| WO | WO 2007143976 | 12/2007 |

* cited by examiner

*Primary Examiner* — Eric A Gates
*Assistant Examiner* — Chwen-Wei Su
(74) *Attorney, Agent, or Firm* — Pandiscio & Pandiscio

(57) ABSTRACT

A power-operated chuck for machine tools, the chuck having a base body attachable to the machine tool, at least two clamping jaws held moveably in the base body are synchronously controlled and moved radially onto a workpiece to be clamped by one wedge rod each, and an actuating element is held in an axially movable arrangement in the base body and is connected in a force-locking arrangement with each of the wedge rods and is held coaxially in the base body in relation to its longitudinal axis, there being play between the actuating element and the base body, the chuck permitting central positioning of the workpiece to be clamped in relation to the longitudinal axis of the chuck and, the chuck permitting the centering adjustment to be undertaken throughout the machining process.

9 Claims, 5 Drawing Sheets

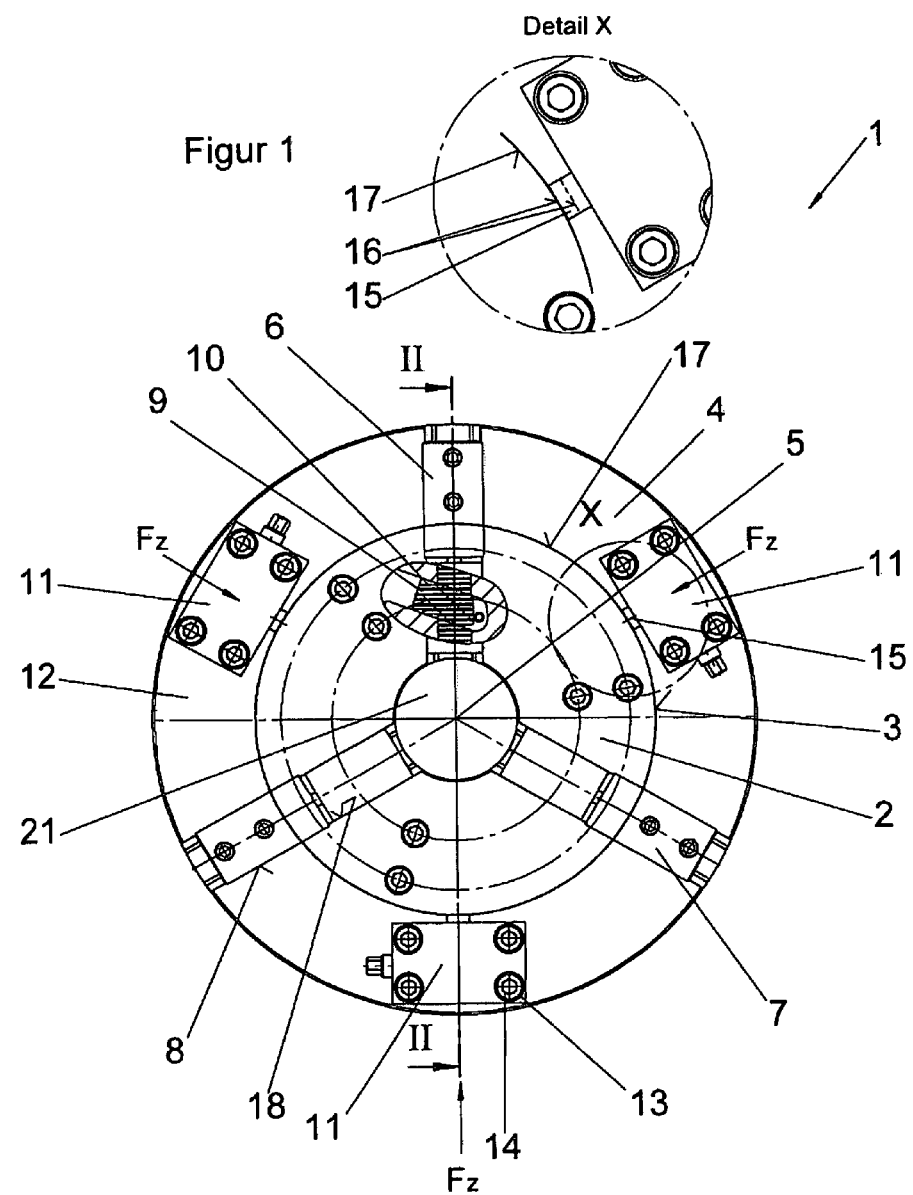
Figur 1

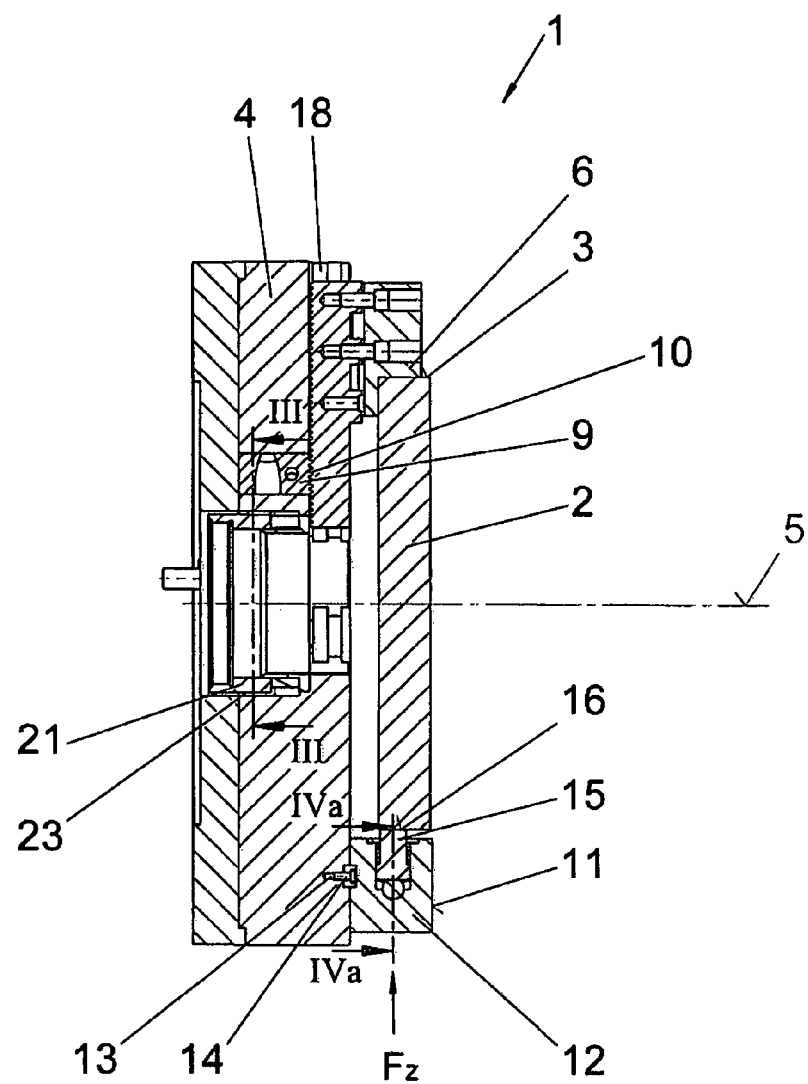
Figur 2

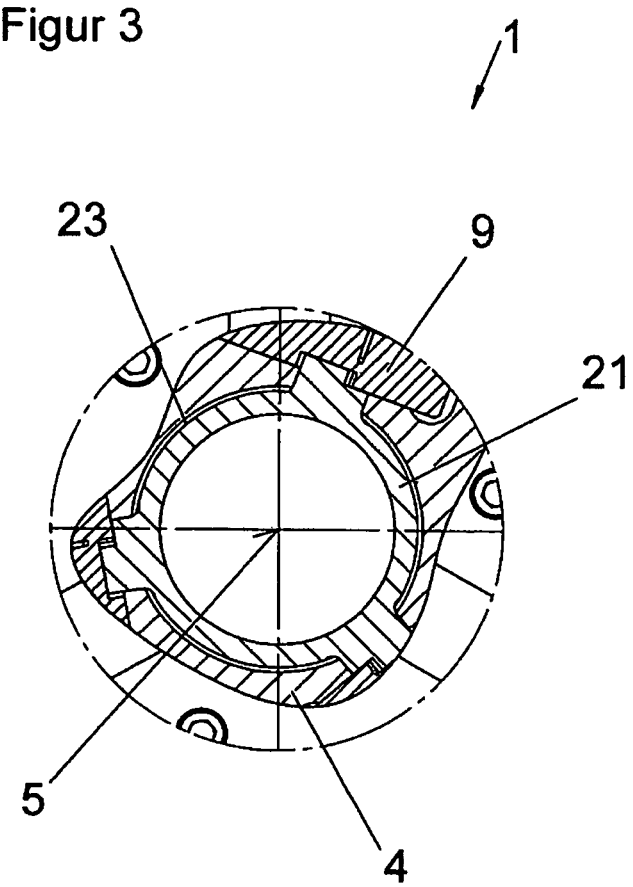
Figur 3

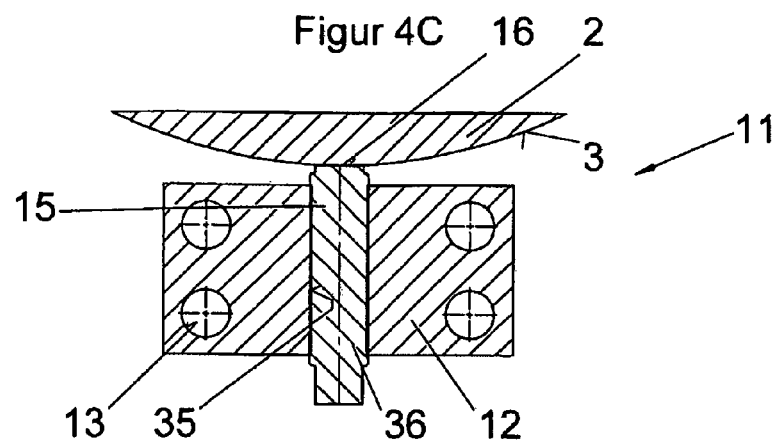
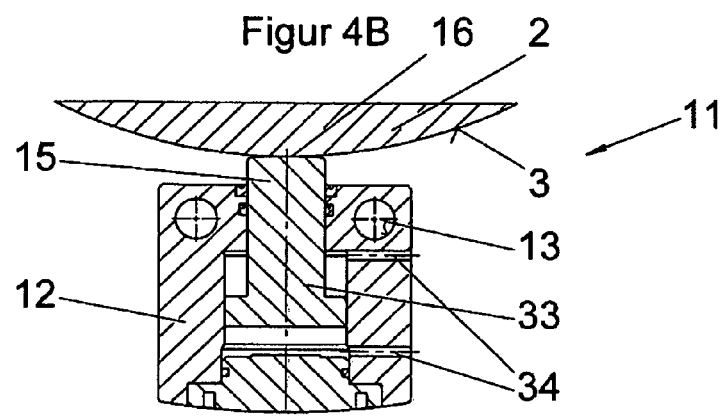
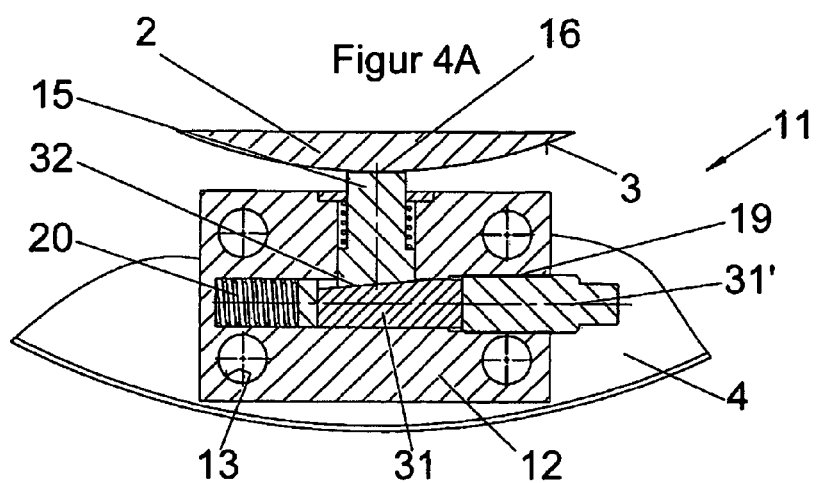

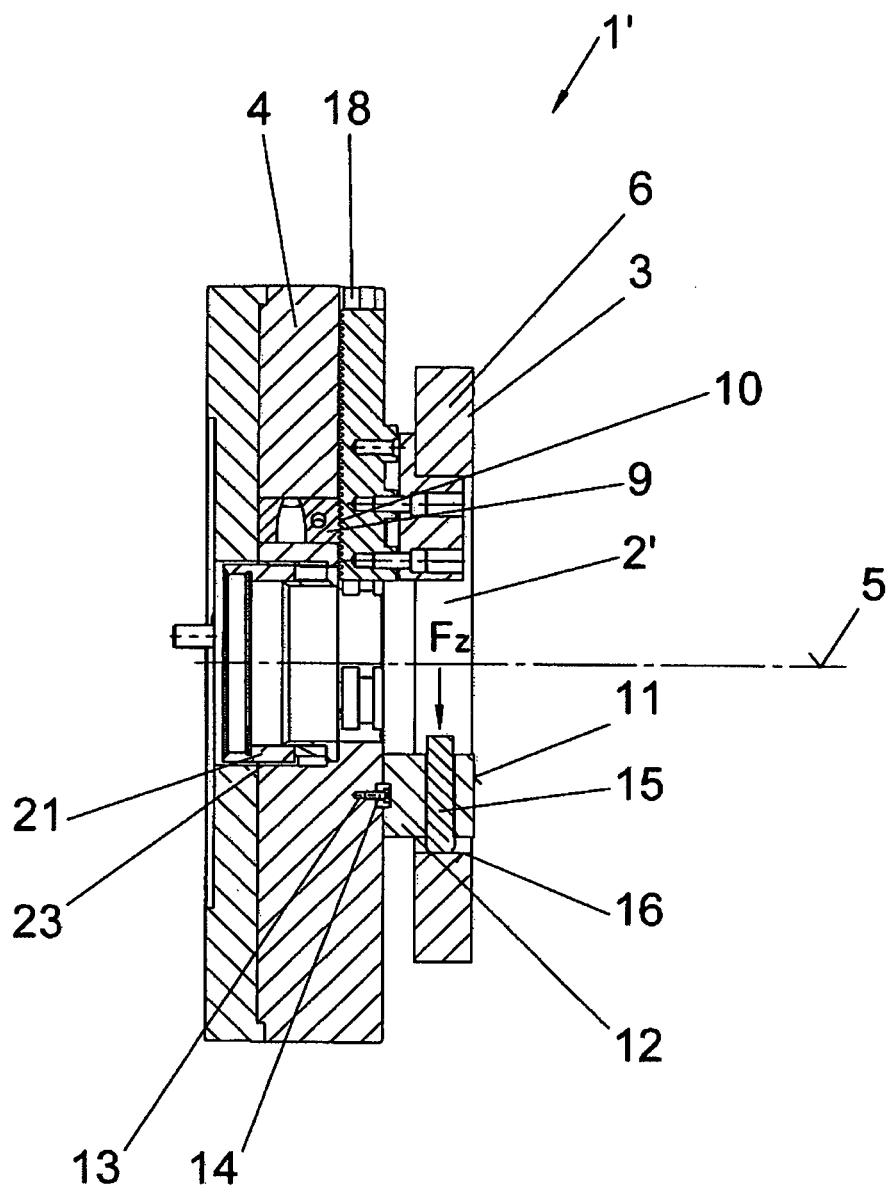
Figur 5

POWER OPERATED CHUCK

BACKGROUND OF THE INVENTION

1. Field of the Invention

The present invention relates to a power-operated chuck.

2. Description of the Prior Art

Power-operated chucks of this kind are disclosed in EP 0069917 and EP 0085782. These power-operated chucks have been developed by the patent Assignee and have been successfully marketed by the same for decades. These power-operated chucks have proven effective in practice.

EP 0085782, in particular, shows that each of the clamping jaws is provided with a compensation clamping jaw set suitable for clamping unevenly shaped workpieces and is adapted to be advanced radially independently from the clamping jaw set. Both the clamping jaw set and the centering clamping jaws are adapted to be actuated by wedge rods.

The chucks developed and sold by the patent Assignee have one technical deficit. This is to say, that if it is necessary to secure workpieces reliably that have a large inherent weight and an exterior diameter of more than 0.5 meters, then chucks of the prior art cannot be used, because workpieces of this kind cannot be centered exactly. Workpieces of this type, for example, are to be used as rotors in large electric motors. These rotors and other rotationally symmetrical workpieces must be manufactured as precision components. Therefore, even during the extensive metal-cutting machining of workpieces of this kind, it is necessary for the workpieces to be clamped as coaxially, or centrally, as possible, in relation to the chuck. This means the longitudinal axis of the workpieces to be clamped must be aligned flush with the longitudinal axis of the chuck.

The chucks of the prior art do make it possible with small workpieces for the existing play between, on the one hand, the actuating element configured as a piston which is mounted in an axially movable arrangement in the base body of the chuck and, on the other hand, the base body. However, the greater the outside circumference of the actuating element, the greater is the amount of play existing between the actuating element, in particular between a piston, and the inside diameter of a base body. Error tolerances of this kind cannot be excluded for reasons of manufacturing requirements.

These bearing play problems cannot be compensated for as inaccuracies in the clamping of the workpiece, rather the inaccuracies are transmitted to the clamping situation of the workpiece. Therefore, there is an inaccuracy between the position of the workpiece and the center of the chuck. It is not possible to compensate for the existing inaccuracies in the subsequent machining of the workpieces, with the effect that there are error tolerances in the final status of the machined workpiece, although such should be avoided in high-precision components.

It has proven to be a further disadvantage in the prior art chucks that clamping errors arise during the machining process which is often time consuming and complicated, because the machined workpiece becomes lighter during the machining process, as a result of having material removed from it. Such working procedures, involving material removal, then result in the original position of the workpiece being changed in relation to the chuck and, therefore, in relation to the machine tool.

The clamped workpieces are rotated by the machine tool in order to be machined, therefore in the case of a chuck with three clamping jaws offset at an angle of 120° in relation to one another, and in particular with exceedingly heavy workpieces of 20 tons inherent weight, for example, it has been observed that one of the chucks which is located from time to time in a certain angular position of the chuck has to carry the weight of the workpiece exclusively, with the effect that chucks of this kind must be configured to be extremely sturdy or with appropriate dimensions, because the individual clamping jaw has to absorb the clamping forces that arise due to the weight of the workpiece.

The purpose of the present invention is, therefore, to configure a power-operated chuck of the aforementioned kind in such a way that, firstly, the workpiece to be clamped is precisely centred in relation to the longitudinal axis of the chuck and, secondly, there is a centering adjustment possibility available permanently throughout the machining process. Furthermore, the chuck in accordance with the present invention provides a reliable and sustained support, even of extremely heavy workpieces, with an inside or outside diameter of at least 0.5 meters. Moreover, it is possible to reduce the number of chucks to a minimum, preferably to two or three chucks.

SUMMARY OF THE INVENTION

At least one centering device is provided on a side which applies a centering force radially onto the workpiece, and therefore the workpiece can be centered exactly, once it has been centered in three clamping jaws, because the corresponding centering device means that the longitudinal axis of the workpiece can be positioned flush in relation to the longitudinal axis of the chuck, without the centering force acting on the clamping jaws. This is because the clamping jaws are connected in a force-locking arrangement with an actuating device, in particular with a piston, via a wedge rod. However, the piston is mounted in a base body of the chuck with a play that is a feature of the manufacturing process, and so this play can be compensated for by means of the corresponding centering device. As a result, the centering force of the corresponding centering device does not act on the clamping jaws and therefore on the wedge rod, the actuating device and the chuck, but rather, compensates for the existing bearing play and/or error tolerances which are in the region of about 5 μm, in particular with extremely large outside diameters. These are significant error tolerances for precision components, and can therefore be compensated for by the centring devices in such a way that the workpieces in the chuck can be installed precisely centrally in the chuck.

The existing error tolerances of the chuck are therefore no longer transferred to the workpiece during the machining process, but are instead compensated for.

During the machining process, half of the existing material, and therefore half of the inherent weight, is sometimes removed from the workpiece by cutting processes; therefore the inherent weight of the workpiece is reduced during the machining process, with the effect that the geometrical clamping conditions are also influenced. The centering devices can be moved independently from the clamping jaws, therefore such changes in the clamping conditions can be compensated for by the centring devices during the machining process, with the effect that the clamped workpiece can be positioned precisely centrally in relation to the chuck at all times without any variation in the clamping force exerted by the clamping jaws.

Furthermore, the centering device acts on the surface of the clamped workpiece, with the effect that the workpiece is supported not only by the clamping jaws, but also by the centering devices on the base body of the chuck.

It is particularly advantageous if three clamping jaws are arranged offset at an angle of 120° in relation to one another, and if one of the centering devices is arranged in between two adjacent clamping jaws. This construction results in the situation that six clamping jaws and centering devices converging on one another at an angle of 60° act on the workpiece, with the effect that the workpiece is reliably supported on the chuck, not only by the clamping jaws but also by the centering devices.

The centering devices can have different design configurations. For example, but not exclusively, the centering devices can be configured as wedges, or as hydraulically operated clamping pins, or as threaded spindles. These centering devices have in common that a radially vectored centering force is applied to the surface of the workpiece and, by means of this centering force, it is possible to shift the workpiece and, with that, the longitudinal axis of the workpiece in relation to the longitudinal axis of the chuck.

Furthermore, the centering devices can be actuated synchronously, jointly, or independently, from one another, with the effect that precise alignment of the workpiece is achieved by the one or more centering devices, depending on the clamping situation.

These setting possibilities mean that the position of the workpiece can be realigned with regard to the material reduction and therefore that the centering devices permit the realignment in position due to the change in position of the workpiece in relation to the midpoint of the chuck caused by the change in weight. As a result, the workpiece is positioned exactly centrally in relation to the chuck throughout the entire machining process; there is no need to remove and reclamp the workpiece because the workpiece is permanently held by the clamping jaws of the chuck throughout the machining processes. It is only the centering devices that need to be actuated in order to reposition the workpiece exactly centrally.

BRIEF DESCRIPTION OF THE DRAWINGS

The drawings show two sample embodiments of a chuck configured in accordance with the present invention, with three differently configured centering devices, the details of which are explained below. In the drawings, FIG. 1 shows a first illustrative embodiment of a chuck with three clamping jaws and three centering devices, shown schematically, arranged with a lateral offset in relation to the clamping jaws, in a plan view, FIG. 2 shows the chuck in accordance with FIG. 1, along a section line II-II, FIG. 3 shows the chuck in accordance with FIG. 2, along a section line III-III, FIG. 4A shows a sample embodiment of a centering device according to FIG. 1, in a section view, FIG. 4B shows a second sample embodiment of a centering device according to FIG. 1, in a section view, FIG. 4C shows a third sample embodiment of a centering device according to FIG. 1, is a section view, and FIG. 5 shows a second sample embodiment of a chuck with three clamping jaws and three centering devices, shown schematically, arranged with a lateral offset in relation to the clamping jaws, in a section view.

DESCRIPTION OF THE PREFERRED EMBODIMENTS

FIGS. 1, 2 and 3 show a chuck 1, by means of which a rotationally symmetrical, preferably round, workpiece 2 is held from the outside on a machine tool (not shown) for the purpose of machining the workpiece 2 by metal cutting. The chuck 1 comprises a base body 4, having a longitudinal axis. Three clamping jaws 6, 7 and 8 are mounted in a radially movable arrangement in guide grooves 18 aligned with the longitudinal axis 5. The clamping jaws 6, 7 and 8 are each driven by a wedge rod 9 arranged movably in the base body 4. Gearing 10 is provided between each of the wedge rods 9 and the clamping jaws 6, 7 or 8, with the effect that a force-locking active connection is provided between each of the clamping jaws 6, 7 or 8 and the corresponding wedge rod 9. Each of the wedge rods 9, as can be seen in particular in FIG. 3, can be driven by an actuating element 21. The actuating element 21 is normally configured as a piston, which is mounted coaxially in the base body 4 in relation to the longitudinal axis 5, and can be moved axially. When the actuating element 21 has a force exerted on it, acting in the direction of the longitudinal axis 5 of the base body 4, this results in the wedge rod 9 shifting its position, with the effect that the inclined profile of the gearings 10 causes the clamping jaws 6, 7 and 8 to be advanced synchronously radially, in the guide grooves 18, towards the workpiece 2, or moved away from it. This means the clamping jaws 6, 7 and 8 hold the workpiece 2 in a rotationally fixed arrangement on the chuck 1.

The rotationally symmetrical workpiece 2 has a longitudinal axis that should be arranged as concentrically as possible in relation to the longitudinal axis 5 throughout the entire machining process of the workpiece 2. Due to play 23, shown schematically in FIG. 3, between the base body 4 and the actuating element 21, however, it is often not possible to achieve this desired concentric or coaxial clamping of the workpiece 2 on the chuck 1. In particular, in the case of extremely large workpieces 2 which have an outside diameter of more than 0.5 meters, and an inherent weight of more than five tons, it is not possible to compensate for error tolerances that are due to the manufacturing conditions, with the effect that the play 23 arises between the base body 4 and the actuating element 21. When the clamping jaws 6, 7 and 8 are advanced, this existing play 23 results in the situation that the longitudinal axis of the workpiece 2 cannot be arranged flush or coaxially with the longitudinal axis 5 of the base body 4.

If, however, the workpiece 2 should be machined, then this error in the clamping of the workpiece 2 results in machining errors on the workpiece 2. In particular, in the case of precision parts, for example rotors or shafts in electric motors or other high-quality machines, systems, or the like, error tolerances of this kind cannot be tolerated. The known error tolerances lead to a play 23 of, for example, at least 5 μm. The existing play 23 of 5 μm is correspondingly transferred to the clamping situation of the workpiece 2 on the chuck 1, with the effect that these error tolerances occur in equal measure during the machining of the workpiece 2, due to the prevailing installation situation.

Furthermore, material is removed from the workpiece 2 during the machining process involving metal cutting, with the effect that the inherent weight of the workpiece 2 is continuously reduced during the machining process. This machining, which reduces material, therefore results in the geometrical clamping situations being altered.

In order to set both the exact position of the workpiece, namely centrally, flush, or coaxially, in relation to the longitudinal axis 5 of the chuck 1, three centering devices 11 are provided, by means of which a radially acting centering force $F_z$ acts on the workpiece 2, in order to compensate for the existing play 23. The centring force $F_z$ should therefore not act on the clamping jaws 6, 7 or 8, but should exclusively compensate for the existing play 23, and align the workpiece 2 in such a way in relation to the longitudinal axis 5 that the longitudinal axis of the workpiece 2 runs flush, or coaxially, in relation to the longitudinal axis 5 of the chuck. It is possible to establish, for example, by electrical sensors or other contact sensors, that the centering devices 11 are securing the workpiece 2 in the required clamping situation, and that the corresponding centering device 11 is secured.

The centering device 11 includes a housing 12 which can be attached in a releasable manner on the base body 4 of the chuck. For this purpose, a plurality of holes 13 are worked into the base body 4 and through-holes are provided in the housing 12 with screws passing through them, in order to screw the housing 12 onto the base body 4. Furthermore, a centering pin 15 is inserted in the housing 12, in which case the centering pin 15 projects from the housing 12 and has a centering surface 16.

The housings 12 of the three centering devices 11 are arranged on the base body 4 such that the centering surfaces 16 of the corresponding centering pins 15 extend along a shared arc 17 which is somewhat larger than the outside radius of the workpiece 2 to be machined. The clamping jaws 6, 7 and 8 are initially provided in order to accommodate the workpiece 2 and to secure it on the chuck 1. As soon as the clamping of the workpiece 2 by the clamping jaws 6, 7 and 8 has been accomplished in the familiar way, then the centering pins 15 of the corresponding centering device 11 must be set radially in relation to the workpiece 2.

FIGS. 4a, 4b and 4c show three differently designed embodiments of the centering device 11.

FIG. 4a shows a wedge 31 inserted in the housing 12 of the centering device 11, which has a tapering clamping surface 32. The centering pin 15 lies on the clamping surface 32 of the wedge 31, with the effect that when the wedge 31 is pushed in, a radially acting centering force $F_z$ is created and causes the centering pin 15 to advance in the direction of the workpiece 2, so that the workpiece 2 has the centering force applied to it. The wedge 31 is pressed against the force of a spring 20 by means of a pin 31' that can be screwed into the housing 12. The pin 31' is held in a clamping thread 19 worked into the housing 12, with the effect that when the pin 31' is unscrewed, a return force is applied to the wedge 31 by the spring 20, by means of which the wedge 31 is pushed out of the housing 12. A spring is also provided between the housing 12 and the centering pin 15, by means of which the centering pin 15 is moved back to its starting position when the wedge 31 is released.

FIG. 4b shows that the centering device 11 is formed from a hydraulic piston 33 on which the centering pin 15 is formed. The two spaces that are separated by the hydraulic piston 33 are filled with hydraulic fluid by means of two hydraulic connections 34, or else the spaces are alternately drained, with the effect that the hydraulic piston 33 has the radially acting centring force $F_z$ applied to it, by means of which the centering pin 15 is advanced towards the workpiece 2, or can be moved away from it.

FIG. 4c shows that the design embodiment of the centering device 11 undertaken in such a manner that a threaded spindle 36 is screwed into a female thread 35 worked into the housing 12, and the centering pin 15 is formed on the threaded spindle 36. Accordingly, when the threaded spindle 36 is screwed in, the centering pin 15 is advanced towards the workpiece 2.

The three design embodiments of the centering device 11, as shown in FIGS. 4a, 4b, 4c, share the common feature that the centering surface 16 provided on the centering pin 15 is advanced out of its starting position corresponding to the arc 17 towards the workpiece 2, and the centering surface 16 exerts a centring force $F_z$ on the workpiece 2 that acts radially from the outside and the inside. During the advance movement of the corresponding centering pin 15, the workpiece 2 is held by the three clamping jaws 6, 7 and 8 on the chuck 1, and consequently on the machine tool that is not shown. The play 23 between the base body 4 and the actuating element 21 can therefore be compensated for by the movements of the corresponding centering pin 15. The centering pins 15 of the corresponding centering device 11 can be adjusted and driven independently of one another or synchronously with one another.

In the sample embodiment shown, the three clamping jaws 6, 7 and 8 are arranged in an angular position of 120° in relation to one another on the base body 4. One each of the centering devices 11 is provided between two adjacent clamping jaws 6, 7 or 8 in a centered position, with the effect that these also adopt a 120° angular position in relation to one other and the three clamping jaws 6, 7 and 8 are arranged at an angle of 60° in relation to the three centering devices 11.

The metal-cutting machining on the workpiece 2 means that its inherent weight is reduced, with the effect that the geometrical clamping situations change. The three clamping jaws 6, 7 and 8 in this case support the workpiece 2 on the chuck 1. The advance movement of the three centering devices 11 means that permanent repositioning of the workpiece 2 is possible in relation to the longitudinal axis 5 of the chuck 1. Therefore, the weight changes of the workpiece 2 can be compensated for by the centering devices 11, without the position of the three clamping jaws 6, 7 and 8 having to be changed.

FIG. 5 shows a chuck 1' by means of which a workpiece 2' is clamped. The workpiece 2' in this case is configured as a rotationally symmetrical hollow body. The three clamping jaws 6, 7 and 8 are arranged inside the workpiece 2' during the clamping position, and exert a clamping force on the workpiece 2' that is directed radially outwards.

The three centering devices 11 are attached to the chuck 1' in the inside of the workpiece 2', with the effect that they exert a centering force $F_z$ onto the workpiece 2' that is directed radially outwards.

The centering surfaces 16 of the three centering pins 15 are on the shared arc 17, the radius of which is smaller than the inside radius of the workpiece 2'.

The corresponding centering device 11 can be actuated from the outside, for example, by means of a tool that can be passed through the workpiece 2', in order to set the position of the corresponding centering device 11 manually. It is also conceivable for the corresponding centering device 11 to be provided with the design embodiments shown in FIGS. 4a, 4b and 4c. The corresponding centering device 11 can, for example, be actuated using the hydraulic drive unit shown in FIG. 4b without the need to reach through the workpiece 2'.

The invention claimed is:

1. A power-operated chuck for machine tools for machining of rotationally symmetrical workpieces, the chuck comprising:
    a base body adapted to be attached to the machine tool,
    at least two clamping jaws held in a movable arrangement in said base body and synchronously controlled and moveable radially onto a workpiece, and which are clamped by means of one wedge rod each,
    and an actuating element held in an axially movable arrangement in said base body, said actuating element being connected with one of the wedge rods, and held coaxially in said base body in relation to a longitudinal axis of said base body, wherein there is play between said actuating element and said base body,
    wherein centering devices are supported on said base body and are provided laterally offset to at least one of said clamping jaws, each of said centering devices being adapted to exert a radially vectored force directly on the workpiece, which force can be adjusted, by means of which play between said actuating element and said base body is compensated, and said centering devices are adapted to be actuated selectively jointly, or synchronously, or independently from one another, and independently from the clamping jaws;

whereby the workpiece is adapted to be moved in three dimensions of space while the jaws are holding the workpiece.

2. The chuck in accordance with claim 1, wherein each of said centering devices is provided with a centering surface directed towards the workpiece, the centering surfaces of said centering devices being arranged in a common arc which exhibits a larger radius than an outside radius of the workpiece, and the centering surface is movable relative to said centering device by means of a centering pin.

3. The chuck in accordance with claim 2, wherein said centering device comprises a housing, and said housing is attached to said base body in a releasable connection, and said housing is adapted to be attached to said base body in different angular positions, and/or in different spacing positions, in relation to the longitudinal axis of said base body.

4. The chuck in accordance with claim 2, wherein the centering pin acts in conjunction with a wedge provided with a clamping surface, by means of which a radially vectored centering force results when the wedge is pushed inwardly, and the centering force acts on the centering pin.

5. The chuck in accordance with claim 3,
wherein the centering pin comprises a threaded spindle radially arranged in a female thread worked into said housing of said centering device, and is adapted to be moved relative to said housing.

6. The chuck in accordance with claim 2, wherein the centering pin is adapted to be actuated by a hydraulically driven piston.

7. The chuck in accordance with claim 1, wherein the workpiece comprises a hollow body, said clamping jaws make contact with the workpiece from outside or inside of said hollow body, said centering devices exert a radial force on the workpiece, and said centering devices are adapted to be accessed through the workpiece in a central axial direction, and are adapted to be moved by means from outside of the workpiece.

8. The chuck in accordance with claim 7, wherein said centering devices are provided with centering surfaces arranged on a common arc provided with a smaller radius than the inside radius of the workpiece.

9. The chuck in accordance with claim 7, wherein the movement means comprise hydraulic means.

* * * * *